(12) United States Patent
Miller et al.

(10) Patent No.: US 9,011,968 B2
(45) Date of Patent: Apr. 21, 2015

(54) ALTERATION OF GRAPHENE DEFECTS

(75) Inventors: Seth Miller, Englewood, CO (US); Thomas Yager, Encinitas, CA (US)

(73) Assignee: Empire Technology Development LLC, Wilmington, DE (US)

( * ) Notice: Subject to any disclaimer, the term of this patent is extended or adjusted under 35 U.S.C. 154(b) by 366 days.

(21) Appl. No.: 13/391,158

(22) PCT Filed: Sep. 16, 2011

(86) PCT No.: PCT/US2011/051893
§ 371 (c)(1),
(2), (4) Date: Feb. 17, 2012

(87) PCT Pub. No.: WO2013/039508
PCT Pub. Date: Mar. 21, 2013

(65) Prior Publication Data
US 2013/0071616 A1    Mar. 21, 2013

(51) Int. Cl.
| | | |
|---|---|---|
| B05D 5/12 | (2006.01) | |
| C01B 31/04 | (2006.01) | |
| B05C 3/20 | (2006.01) | |
| B05C 3/00 | (2006.01) | |
| B32B 3/10 | (2006.01) | |
| B32B 9/04 | (2006.01) | |

(52) U.S. Cl.
CPC ......... *C01B 31/0484* (2013.01); *C01B 31/0438* (2013.01); *B05D 5/12* (2013.01); *Y10T 428/24331* (2015.01); *B05C 3/20* (2013.01); *B32B 9/04* (2013.01); *B32B 3/10* (2013.01); *C01B 31/0446* (2013.01)

(58) Field of Classification Search
None
See application file for complete search history.

(56) References Cited

U.S. PATENT DOCUMENTS

2007/0157870 A1    7/2007  Hourai et al.
2009/0291270 A1   11/2009  Zettl et al.
(Continued)

FOREIGN PATENT DOCUMENTS

CN    102602925 A  *  7/2012
JP    2002211956 A     7/2002
(Continued)

OTHER PUBLICATIONS

DE Office Action for related application in Germany No. 11 2011 100 116.9 based on International application No. PCT/US2011/051870, dated May 11, 2012, 8 pages.
(Continued)

*Primary Examiner* — William Phillip Fletcher, III
(74) *Attorney, Agent, or Firm* — Moritt Hock & Hamroff LLP; Steven S. Rubin, Esq.

(57) ABSTRACT

Technologies are generally described for method and systems effective to at least partially alter a defect in a layer including graphene. In some examples, the methods may include receiving the layer on a substrate where the layer includes at least some graphene and at least some defect areas in the graphene. The defect areas may reveal exposed areas of the substrate. The methods may also include reacting the substrate under sufficient reaction conditions to produce at least one cationic area in at least one of the exposed areas. The methods may further include adhering graphene oxide to the at least one cationic area to produce a graphene oxide layer. The methods may further include reducing the graphene oxide layer to produce at least one altered defect area in the layer.

10 Claims, 4 Drawing Sheets

(56) References Cited

U.S. PATENT DOCUMENTS

| | | | |
|---|---|---|---|
| 2010/0105834 | A1 | 4/2010 | Tour et al. |
| 2010/0218801 | A1 | 9/2010 | Sung et al. |
| 2011/0017585 | A1 | 1/2011 | Zhamu et al. |
| 2011/0041980 | A1 | 2/2011 | Kim et al. |
| 2011/0052813 | A1 | 3/2011 | Ho et al. |
| 2011/0084252 | A1 | 4/2011 | Wu et al. |
| 2011/0092054 | A1 | 4/2011 | Seo et al. |
| 2011/0104442 | A1 | 5/2011 | Yoon et al. |
| 2011/0104507 | A1 | 5/2011 | Choi et al. |
| 2011/0135884 | A1 | 6/2011 | Lettow et al. |
| 2011/0143034 | A1 | 6/2011 | Ahn et al. |
| 2011/0143045 | A1 | 6/2011 | Veerasamy |
| 2011/0143101 | A1* | 6/2011 | Sandhu ............ 428/195.1 |
| 2011/0186806 | A1 | 8/2011 | Bowers et al. |
| 2012/0003438 | A1 | 1/2012 | Appleton et al. |
| 2012/0021224 | A1* | 1/2012 | Everett et al. .......... 428/408 |
| 2013/0071616 | A1 | 3/2013 | Miller et al. |
| 2013/0230722 | A1 | 9/2013 | Fuji et al. |
| 2013/0292161 | A1 | 11/2013 | Liu et al. |

FOREIGN PATENT DOCUMENTS

| | | |
|---|---|---|
| JP | 2009046378 | 3/2009 |
| JP | 2010195671 | 9/2010 |
| JP | 2011-105569 A | 6/2011 |
| JP | 2011121828 A | 6/2011 |
| JP | 2011520741 A | 7/2011 |
| JP | 2011178617 A | 9/2011 |
| JP | 2013510071 A | 3/2013 |
| JP | 2013542546 A | 11/2013 |
| WO | 2008/048192 A1 | 4/2008 |
| WO | 2009/089391 A2 | 7/2009 |
| WO | 2009128349 A1 | 10/2009 |
| WO | 2010/001123 A1 | 7/2010 |

OTHER PUBLICATIONS

Liu, H. et al., "Chemical Doping of Graphene", Journal of Materials Chemistry, Mar. 2011, pp. 3335-3345, vol. 21, 10.
Wu, Z. S., et al., "Doped Graphene Sheets as Anode Materials with Superhigh Rate and Large Capacity for Lithium Ion Batteries", American Chemical Society, 2011, 5463-5471.
Zhang, Y.H., et al., "Effects of Stone-Wales defect on the interactions between NH3, NO2 and graphene," Journal of Nanoscience and Nanotechnology, vol. 10, No. 11, Nov. 2010, pp. 7347-7350.
"Ideal Torsional Strengths and Stiffnesses of Carbon Nanotubes," accessed at http://web.archive.org/web/20110813190824/http://cms.mse.berkeley.edu/elif/Research/CNTs.html, accessed on Nov. 18, 2013, pp. 1-3.
"Glovebox," last modified on Aug. 23, 2013, accessed at http://en.wikipedia.org/wiki/Glovebox, accessed on Nov. 29, 2013, pp. 1-4.
Sungjin Park and Rodney S. Ruoff, Chemical Methods for the Production of Graphenes, Nature Nanotechnology, vol. 4, Apr. 2009, 217-224.
Bagri et al., Structural Revolution During the Reduction of Chemically Derived Graphene Oxide, Nature Chemistry 2, 581-587 (2010).
Gilje et al., A Chemical Route to Graphene for Device Applications, Nano Lett., vol. 7, No. 11, 2007, 3394-3398.
Gao et al., Hydrazine and Thermal Reduction of Graphene Oxide: Reaction Mechanisms, Product Structures, and Reaction Design, J. Phys. Chem.C 2010,114, 832-842.
Chapman, O. L. & Borden, G. W., Rearrangement in Borate Pyrolysis, Journal of Organic Chemistry, 1961, 26 (11). 4193-4195.
Singaram et al., Unusual Directive Effects in the Hydroboration of a Disubstituted Enamies. Conversion of a-Substituted Aldehydes to the Corresponding Alkenes and B-Amino Alcohols, Journal of Organic Chemistry, 1991, 56, 5691-5696.
http://www.appliedmst.com/products_mvd100.htm, downloaded on Jun. 1, 2012, 1 page.
http://www.sigmaaldrich.com/chemistry/chemistry-products.html?TablePage=16280330, downloaded on Jun. 11, 2012, 6 pages.
http://www.sigmaaldrich.com/chemistry/chemistry-products.html?TablePage=16280286, downloaded on Jun. 11, 2012, 3 pages.
Brown et al., Forty Years of hydride reductions, Tetrahedron, vol. 5, Issue 5, 1979, pp. 567-607.
Vath et al., Method for the Derivatization of Organic Compounds at the Sub-nanomole Level with Reagent Vapor, Fresenius Journal of Analytical Chemistry, 1988, 331, 248-252.
International Search Report and Written Opinion for application with No. PCT/US2011/051870 dated Nov. 7, 2011.
http://www.eaglabs.com/techniques/analytical_techniques/txrf.php, downloaded Jun. 12, 2012, 2 pages.
http://www.eaglabs.com/techniques/analytical_techniques/rbs.php, downloaded Jun. 12, 2012, 2 pages.
Richards et al., Low voltage backscattered electron imaging (<5 KV) using field emission scanning electron microscopy, Scanning Microscopy, 1999, 13, 55-60.
http://en.wikipedia.org/wiki/Stone-Wales_defect, dowloaded Sep. 11, 2012, 1 page.
Lusk, Mark T. & Carr, Lincoln D., Nano-Engineering Defect Structures on Graphene, http://arxiv.org/pdf/0712.1035, Sep. 23, 2008.
Liu et al., Graphene Oxidation: Thickness-Dependent Etching and Strong Chemical Doping, Nano Lett, vol. 8, 7, 2008, 1965-1970.
Romero et al., Adsorption of ammonia on graphene, Nanotechnology, 20, 2009, 245501.
http://en.wikipedia.org/wiki/Boron_tribromide, downloaded Jun. 13, 2012, 3 pages.
Wang et al., Atomic Layer Deposition of Metal Oxides on Pristine and Functionalized, http://www.stanford.edu/dept/chemistry/faculty/dai/group/Reprint/137.pdf downloaded Sep. 4, 2012, 4 pages.
Salzano, F. J., The Behavior of Iodine in Graphite, Carbon 1964, vol. 2, 73-81.
http://serc.carleton.edu/research_education/geochemsheets/bse.html, downloaded Jun. 13, 2012, 2 pages.
Cretu et al., Migration and Localization of Metal Atoms on Strained Graphene, PRL 105, 2010, 196102.CRETU et al., Migration and Localization of Metal Atoms on Strained Graphene, PRL 105, 2010, 196102.
International Search Report and Written Opinion for application with No. PCT/US2011/051876 dated Jan. 12, 2011.
Bae et al., Roll-to-roll Production of 30-inch Graphene Films for Transparent Electrodes, Nature Nanotechnology, Published online: Jun. 20, 2010, 6 pages.
Li, X. et al. Supporting Online Material for Large-Area Synthesis of High-quality and uniform Graphene Films on Copper Foils, Science Express, May 7, 2009, 4 pages.
Yang et al., Fabrication of Graphene-Encapsulated OxideNanoparticles: Towards High-Performance Anode Materials for Lithium Storage, Angew. Chem. Int. Ed., 49, 2010, 8408-8411.
Vickery et al., Fabrication of Graphene-Polymer Nanocomposites with High-order Three-Dimensional Architectures, Adv. Mater., 21, 2009, 2180-2184.
Park, Sungjin and Ruoff, Rodney S., Chemical methods for the production of graphenes, Nature Nanotechnology, vol. 4, Apr. 2009, 217-224.
Wang, Z. et al., Direct Electrochemical Reduction of Single-Layer Graphen Oxide and Subsequent Functionalization with Glucose Oxidase, J. Phys. Chem. C, vol. 113, 32, 2009, 5 pages.
Li, X, et al., Highly Conducting Graphene Sheets and Langmuir-Blodgett films, Nature 538 Nanotechnology, vol. 3, Sep. 2008, 5 pages.
Ou, J. et al., Tribiology study of reduced graphene oxide sheets on silicon substratesynthesized via covalent assembly, Langmuir, 26, 2010, 15830-15836.
Li, H. H et al., Aminosilane micropatterns on hydroxyl-terminated substrates: fabrication and application, Langmuir, 2010, 8 pages.
Li, X. et al., Highly conducting graphene sheets and Langmuir-Blodgett films, Nat Nanotech, 3, 2008, 538-542.
Gomez-Navgomez-Navarro, C. et al., Electronic transport properties of individual chemically reduced graphene oxide sheets, Nano Letter, 7, 2007, 3499-3503.
Mettevi, C. et al., A Review of chemical vapor deposition of graphene on copper, J. Mater. Chem., 2011, 11 pages.

(56) References Cited

OTHER PUBLICATIONS

Lopez, V. et al., Chemical vapor deposition repair of graphene oxide: a route to highly conductive graphene momolayers, Adv. Mater., 21, 2009, 4683-4686.

International Search Report and Written Opinion for application with No. PCT/US2011/051893 dated Nov. 4, 2011.

Lin J. et al., Molecular absorption and photodesorption in pristine and functionalized large-area graphene layers, Nanotechnology, vol. 22, 5, Aug. 2011, 6 pages.

Wang X. et al., N-Doping of Graphene Through Electrothermal reactions with Ammonia, Science, vol. 324, 768-771, May 8, 2009, 4 pages.

Jung N. et al., Charge Transfer Chemical Doping of Few Layer Graphenes: Charge Distribution and Band Gap Formation, Nano Lett., vol. 9, 12, Oct. 14, 2009, 4133-4137.

Banhart F. et al., Structural Defects in Graphene, ACSNANO, vol. 5, 1, published online Nov. 23, 2010, 26-41.

Schedin F. et al., Detection of individual gas molecules adsorbed on graphene, Nature Materials, vol. 6, Jul. 29, 2077, 652-655.

Carr, L. D., et al., "Graphene gets designer defects". Nature Nanotechnology, May 2010, pp. 316-317, vol. 5.

Ghosh, S., et al., "Extremely high thermal conductivity of graphene: Prospects for thermal management applications in nanoelectronic circuits". Applied Physics Letters 92, 151911, 2008, pp. 1-3.

Wang, X. et al., "N-Doping of Graphene Through Electrothermal Reactions with Ammonia," Science, May 8, 2009, pp. 768-771, vol. 324, No. 5928.

Lopez, V. et al., "Chemical Vapor Deposition Repair of Graphene Oxide: A Route to Highly Conductive Graphene Monolaters", Advanced Materials, 2009, 4683-4686.

\* cited by examiner

200

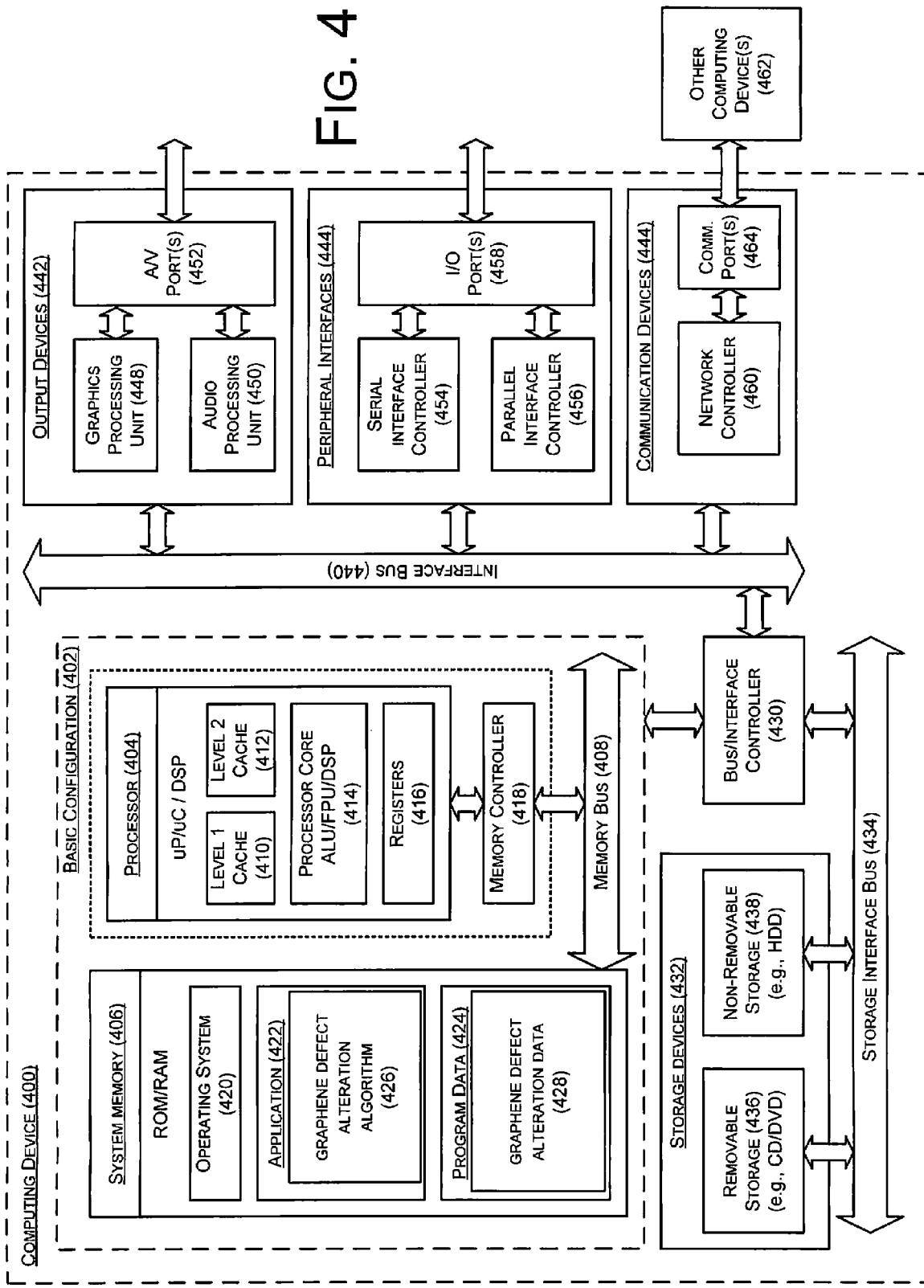

ALTERATION OF GRAPHENE DEFECTS

CROSS-REFERENCE TO RELATED APPLICATIONS

The present application is a national stage filing under 35 U.S.C. §371 of PCT Application Ser. No. PCT/US11/51893 filed on Sep. 16, 2011. The disclosure of the PCT Application is hereby incorporated herein by reference in its entirety. The present application is related to the following listed application(s): U.S. application Ser. No. 13/377,971, entitled "GRAPHENE DEFECT ALTERATION", naming Seth Miller as inventor, filed on Dec. 13, 2011 and U.S. application Ser. No. 13/496,064, entitled "GRAPHENE DEFECT DETECTION", naming Seth Miller as inventor, filed on Mar. 14, 2012.

BACKGROUND

Unless otherwise indicated herein, the materials described in this section are not prior art to the claims in this application and are not admitted to be prior art by inclusion in this section.

Graphene is a material that generally may include a one atom thick layer of bonded carbon atoms. Graphene may be formed by growing carbon atoms on top of another material such as copper. The copper may be inserted into a quartz tube, heated, and annealed. A gas mixture of $CH_4$ and $H_2$ may then be flowed into the tube and the copper may then be cooled with flowing $H_2$ to form graphene.

SUMMARY

In some examples, a method for at least partially altering a defect area in a layer on a substrate, where the layer includes graphene, is generally described. Some methods may include receiving the layer, on the substrate, where the layer may include at least some defect areas in the graphene. The defect areas may reveal exposed areas of the substrate. The methods may also include reacting the substrate under sufficient reaction conditions effective to produce at least one cationic area in at least one of the exposed areas. The methods may further include adhering graphene oxide to the at least one cationic area to produce a graphene oxide layer. The methods may further include reducing the graphene oxide layer to produce at least one altered defect area in the layer.

In some examples, a system effective to at least partially alter a defect area in a layer on a substrate, where the layer includes graphene, is generally described. In various examples, the system may include a chamber and a container configured in communication with the chamber. The chamber may be configured effective to receive a layer on a substrate, where the layer may include at least some graphene, and may include at least some defect areas in the graphene. The defect areas may be effective to reveal exposed areas of the substrate. The chamber and the container may be configured effective to react the substrate under sufficient reaction conditions to produce at least one cationic area in at least one of the exposed areas. The chamber and the container may be configured effective to adhere graphene oxide to the at least one cationic area to produce a graphene oxide layer. The chamber and the container may further be configured effective to reduce the graphene oxide layer to produce at least one altered defect area in the layer.

In some examples, a processed layer is generally described. The layer may include at least some graphene on a substrate. The layer may include at least one defect area in the graphene. The defect area may be effective to reveal a cationic area of the substrate. The layer may further include a reduced graphene oxide layer adhered to the cationic area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a block diagram illustrating an example computing device that is arranged to implement graphene defect alteration; all arranged according to at least some embodiments described herein.

DETAILED DESCRIPTION

Figure 1:
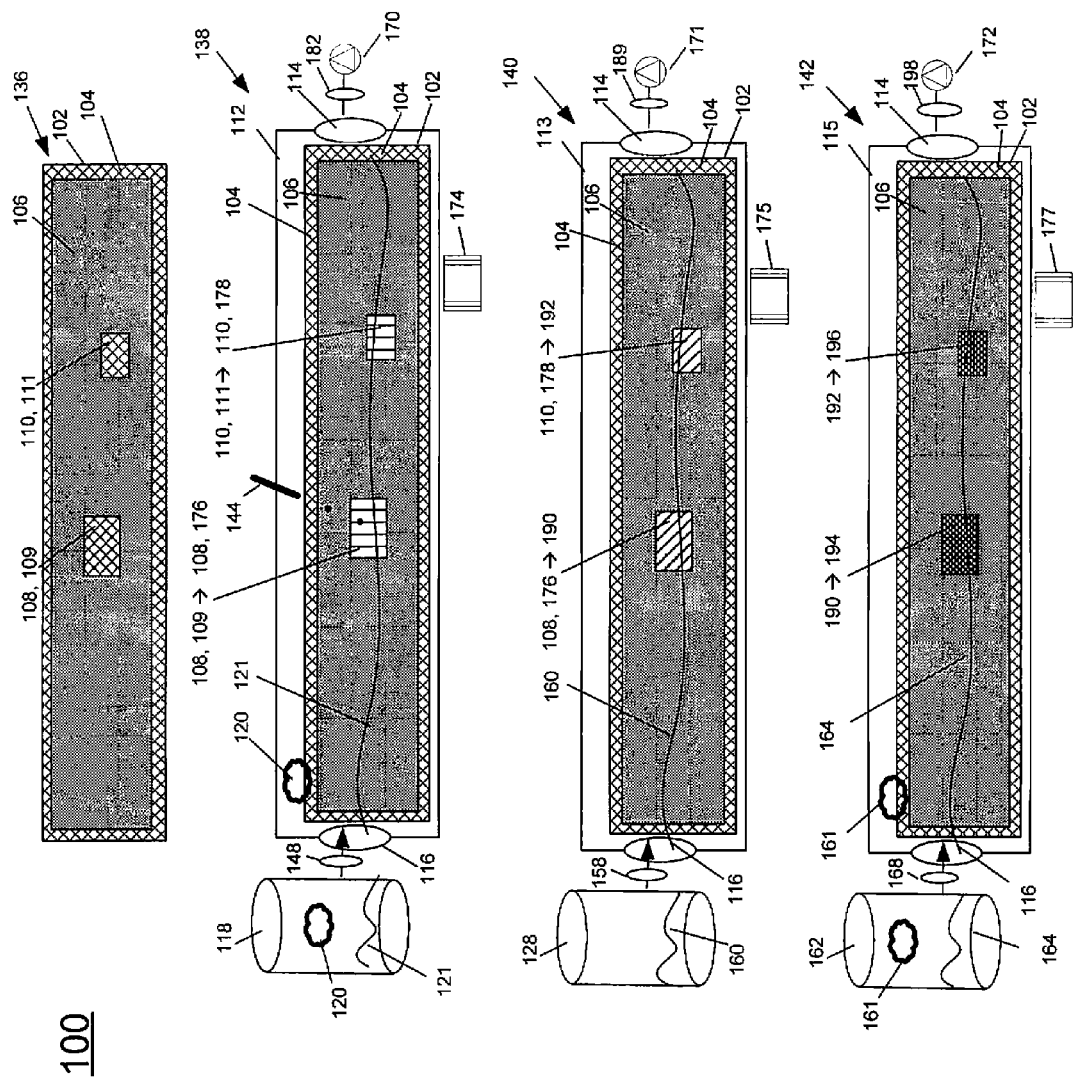
FIG. 1 illustrates an example system that can be utilized to implement graphene defect alteration.
Figure 1:
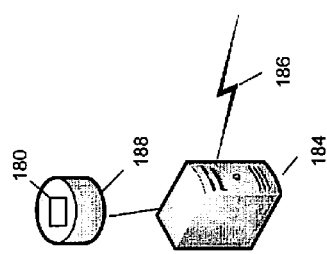

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to graphene defect alteration.

Briefly stated, technologies are generally described for method and systems effective to at least partially alter a defect in a layer including graphene. In some examples, the methods may include receiving the layer on a substrate where the layer includes at least some graphene and at least some defect areas in the graphene. The defect areas may reveal exposed areas of the substrate. The methods may also include reacting the substrate under sufficient reaction conditions to produce at least one cationic area in at least one of the exposed areas. The methods may further include adhering graphene oxide to the at least one cationic area to produce a graphene oxide layer. The methods may further include reducing the graphene oxide layer to produce at least one altered defect area in the layer.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement graphene defect alteration in accordance with at least some embodiments described herein. An example graphene defect alteration system 100 may include one or more chambers 112, 113, 115, one or more containers 118, 128, 162, one or more heaters 174, 175, 177, one or more valves 148, 158, 168, 182, 189, 198 and/or one or more pumps 170, 171, 172. At least some of the elements of defect alteration system 100 may be arranged in communication with a processor 184 through a communication link 186. In some examples, processor 184 may be adapted in communication with a memory 188 that may include instructions 180 stored therein. Processor 184 may be configured, such as by instructions 180, to control at least some of the operations/actions/functions described below.

During a graphene formation process, cracks, voids, tears or other defects or defect areas may form in graphene 106. Such defects may result from impurities in the graphene formation process and/or in transferring the graphene to a substrate. These defects may degrade an operation of the graphene in some applications. For example, an electrical conductivity of the graphene may be decreased due to the presence of the defects as electrons may move around a defect. This may increase resistance and produce local magnetic fields. An increase in inductance may also occur. In examples where graphene is used as a conducting trace (such as in a display or high frequency circuit) an open, non-functioning, circuit may result. Gas permeability may be affected. Mechanical strength may be impacted, as a void may be a stress concentrator. The chemical reactivity of the graphene may be increased by the presence of a defect. In an example, as shown at 136, a layer 102 including graphene 106 on substrate 104 may include defects 108 and/or 110 revealing exposed areas 109, 111 of substrate 104. In an example, substrate 104 may include an electrical insulator. In an example, substrate 104 may be made of, for example, plastic, silicon, $SiO_2$, glass, gold, silver, polyethylene terephthalate (PET) etc. As discussed in more detail below, layer 102 and substrate 104 may be exposed to a material effective to produce a cationic area in exposed areas of substrate 104. Graphene oxide may then be applied to the cationic areas and then the graphene oxide may be reduced to at least partially alter defect areas in layer 102.

As shown at 138, layer 102 and substrate 104 may be placed, such as by hand or machine, in a chamber 112. Chamber 112 may include ports 114, 116 and chamber 112 may be in communication with pump 170, heater 174 and/or container 118. Container 118, along with pump 170, may be configured, such as by control of processor 184, effective to apply a gas 120 or a liquid 121 to substrate 104, graphene 106 and/or exposed areas 109, 111. Gas 120 or liquid 121 may include a material effective to produce cationic areas 176, 178 at exposed areas 109, 111 revealed due to the presence of defect areas 108, 110. For example gas 120 or liquid 121 may include an amine terminated material or an amine terminated siloxane such as aminopropyltriethoxysilane (APTS) or polyethylenimine (PEI). In an example, APTS may bond with silanols in substrate 104 producing an amine functionality on substrate 102 in exposed areas 109, 111 thereby producing cationic areas 176, 178.

In an example, gas 120 or liquid 121 may be applied to layer 102 and substrate 104 while heater 174 heats layer 102 and substrate 104 to a temperature in a range of about 25 degrees Celsius to about 40 degrees Celsius at about 1 atmosphere for a time interval of about 1 minute to about 2 minutes. In an example where substrate 104 includes plastic, a discharge electrode 144 may be in operative relationship with chamber 112 and may be configured effective to produce a corona discharge on substrate 104 oxidizing substrate 104 at exposed areas 109, 111. For example, the corona discharge may be implemented prior to a transfer of graphene from a location where the graphene was formed to a location where the graphene may be used. In this example, carboxylic acid functionalities may be created. Liquid 121 may include a polymer that is cationic, such as PEI, that may bond to the carboxyl acid functionalities to produce cationic areas 176, 178.

As shown at 140, substrate 104, with graphene 106, defect areas 108, 110, and cationic areas 176, 178, may be placed, such as by hand or machine, in chamber 113. A container 128 may be in communication with chamber 113. Container 128 may be configured, such as under control by a controller such as processor 184 effective to apply a liquid 160 to substrate 104 with cationic areas 176, 178. For example, substrate 104 may be submersed in liquid 160. Liquid 160 may include graphene oxide (GO) such as a solution including water and GO. Liquid or graphene oxide solution 160 may be anionic so that flakes of graphene oxide may adhere to cationic areas 176, 178 in an anionic dispersion producing a graphene oxide layer 190 and a graphene oxide layer 192. For example, the anionic graphene oxide flakes may adhere to the cationic APTS and/or PEI.

In an example, liquid 160 may be applied to substrate 104 while heater 175 heats substrate 104 to a temperature in a range of about 15 degrees Celsius to about 25 degrees Celsius for a time interval of about 1 minute to about 2 minutes. Pump 171 may be configured, such as under control by a controller such as processor 184, effective to generate or control pressure in chamber 112 to be from about 0.5 to about 2 atmospheres in chamber 113. Graphene oxide that does not adhere to cationic areas 176, 178 may be washed away such as by flowing liquid 160, including water, across layer 102 in chamber 113.

As shown at 142, layer 102 with graphene oxide layers 190, 192 may be placed, such as by hand or machine, in chamber 115. A container 162 may be in communication with chamber 115 and may include a liquid 164 and/or gas 161. Chamber 115 may be effective to reduce graphene oxide in graphene oxide layers 190, 192 by applying liquid 164 and/or gas 161 to graphene oxide layers 190, 192 to produce altered defect or reduced graphene oxide areas 194, 196. For example, container 162 may include a liquid 164 or gas 161 including a hydrazine solution. In an example, liquid 164 may include about 0.5% to 5% hydrazine by weight. In an example, container 162 may include a liquid 164 or gas 161 including sodium borohydride and water. A pressure, reaction time and temperature in chamber 115 may be adjusted to at least partially reduce graphene oxide in graphene oxide layers 190, 192 to produce altered defect or reduced graphene oxide areas 194, 196. In an example, heater 177 may be configured, such as under control by a controller such as processor 184, effective to heat layer 102 and substrate 104 to a temperature in a range of from about 50 degrees Celsius to about 300 degrees Celsius for a time interval of from about 2 hours to about 4 hours. In the example, pump 172 may be configured effective to generate or control a pressure in chamber 115 of about 3 atmospheres to about 5 atmospheres.

Among other potential benefits, a system arranged in accordance with the present disclosure may be used to at least partially alter defect areas in a layer including graphene. Defects may be altered even after graphene has been transferred from a location from where the graphene was grown. Graphene may be used in applications that may be sensitive to voids or cracks such as technologies that use graphene for lithography as may occur in displays, microelectronic circuits, electronic interconnects, and/or optical applications.

Figure 2:
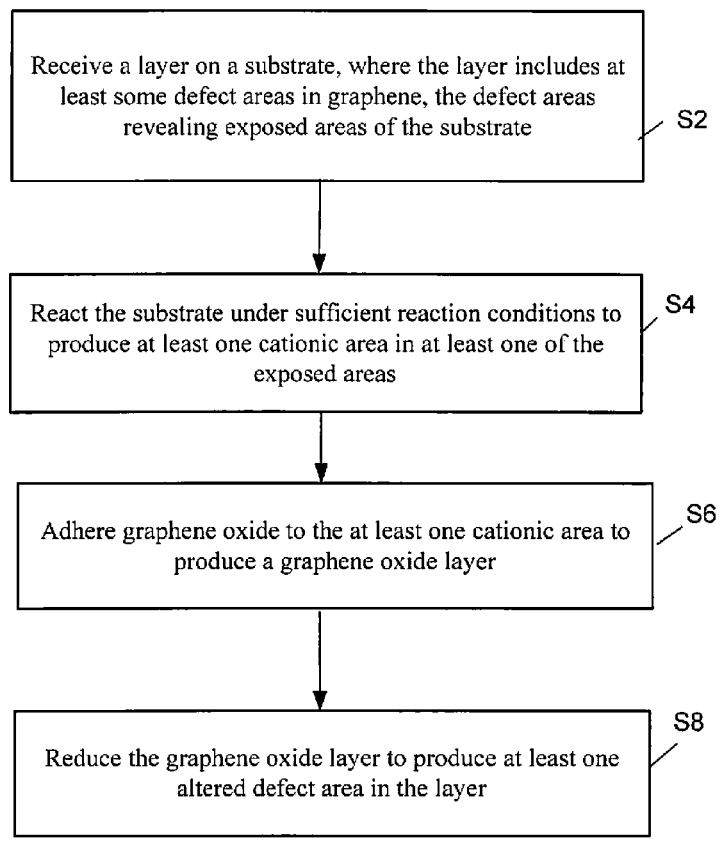
FIG. 2 depicts a flow diagram for an example process for implementing graphene defect alteration.

FIG. 2 depicts a flow diagram for an example process 200 for implementing graphene defect alteration arranged in accordance with at least some embodiments described herein. The process in FIG. 2 could be implemented using, for example, system 100 discussed above, where processor 184 may be adapted, via instructions, to control and facilitate the various processing operations through interfaces as will be further described with respect to FIG. 4. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Process 200 may begin at block S2, "Receive a layer on a substrate, where the layer includes at least some defect areas in graphene, the defect areas revealing exposed areas of the substrate" At block S2, a chamber may be configured effective to receive a layer on a substrate. The layer may include at least some defect areas in graphene. The defect areas may reveal exposed areas of the substrate.

Processing may continue from block S2 to block S4, "React the substrate under sufficient reaction conditions to produce at least one cationic area in at least one of the exposed areas." At block S4, the chamber along with valves and a container including a gas or liquid may be configured, such as under control by a controller such as processor 184, effective to react the substrate to produce at least one cationic area in at least one of the exposed areas. For example, a gas or liquid including an amine terminated material such as APTS or PEI may be applied from the container through the valve to the layer and substrate in the chamber.

Processing may continue from block S4 to block S6, "Adhere graphene oxide to the at least one cationic area to produce a graphene oxide layer." At block S6, the chamber along with valves and a container including a gas or liquid may be configured such as under control by a controller such as processor 184, effective to adhere graphene oxide to the at least one cationic area to produce a graphene oxide layer. For example, a container in fluid communication with the chamber may be configured, such as under control by a controller such as processor 184, effective to apply a gas or liquid including graphene oxide to the layer and substrate. The graphene oxide may adhere to the cationic areas.

Processing may continue from block S6 to block S8, "Reduce the graphene oxide layer to produce at least one altered defect area in the layer." At block S8, the chamber along with valves and a container including a gas or a liquid may be configured such as under control by a controller such as processor 184, effective to reduce the graphene oxide layer. For example, a container in fluid communication with the chamber may be configured such as under control by a controller such as a processor, effective to apply a liquid or gas including a hydrazine solution to the graphene oxide layer. For example, a container in fluid communication with the chamber may be configured such as under control by a controller such as a processor, effective to apply a liquid or gas including a sodium borohydride and water solution to the graphene oxide layer.

Figure 3:
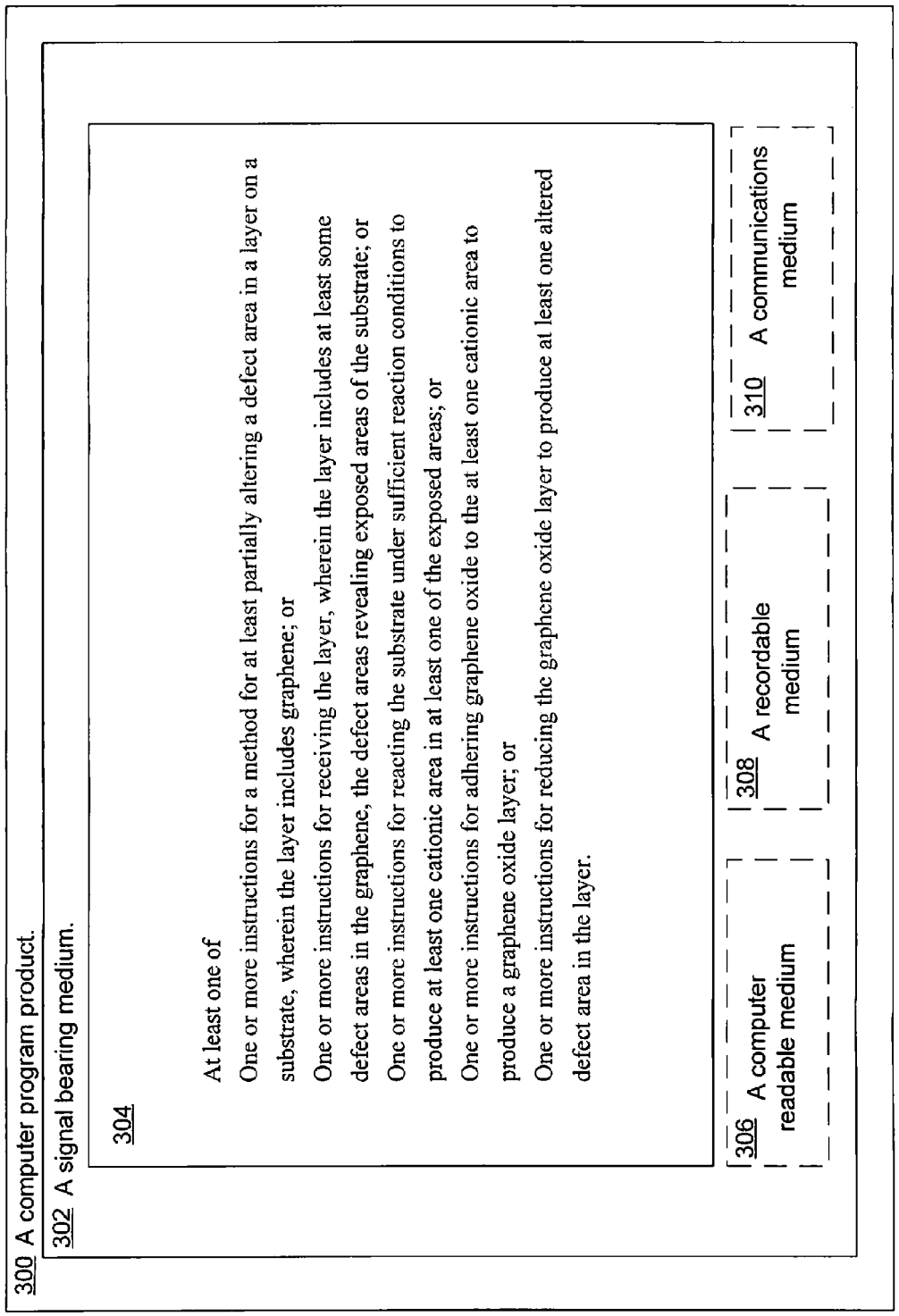
FIG. 3 illustrates a computer program product that can be utilized to implement graphene defect alteration.

FIG. 3 illustrates a computer program product that can be utilized to implement graphene defect alteration in accordance with at least some embodiments described herein. Program product 300 may include a signal bearing medium 302.

Signal bearing medium 302 may include one or more instructions 304 that, when executed by, for example, a processor, may provide the functionality described above with respect to FIGS. 1-2. Thus, for example, referring to system 100, processor 184 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device that is arranged to implement graphene defect alteration according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a graphene defect alteration algorithm 426 that is arranged to perform the various functions/actions/operations as described herein including at least those described with respect to system 100 of FIGS. 1-3. Program data 424 may include graphene defect alteration data 428 that may be useful for implementing graphene defect alteration as is described herein. In some embodiments, application 422 may be arranged to operate with program data 424 on operating system 420 such that graphene defect processing may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for at least partially altering a defect area in a layer on a substrate, wherein the layer includes graphene, the method comprising:

placing the layer on the substrate in a chamber, wherein the layer includes at least some defect areas in the graphene, the defect areas revealing exposed areas of the substrate;

reacting the substrate under sufficient reaction conditions to produce at least one cationic area in at least one of the exposed areas;

adhering graphene oxide to the at least one cationic area to produce a graphene oxide layer; and reducing the graphene oxide layer to produce at least one altered defect area in the layer.

2. The method as recited in claim 1, wherein the substrate includes at least one of plastic, $SiO_2$, glass, gold, silver, and/or polyethylene terephthalate.

3. The method as recited in claim 1, wherein the substrate includes silicon and the method further comprises reacting the substrate by applying aminopropyltriethoxysilane to the substrate.

4. The method as recited in claim 1, wherein reacting the substrate further comprises applying an amine terminated material to the substrate.

5. The method as recited in claim 1, wherein reacting the substrate further comprises applying an amine terminated siloxane to the substrate.

6. The method as recited in claim 1, wherein reacting the substrate further comprises applying polyethylenimine to the substrate.

7. The method as recited in claim 1, wherein reacting the substrate further comprises producing a corona discharge on the substrate to produce carboxylic acid functionalities on the substrate and applying polyethylenimine to the carboxylic acid functionalities.

8. The method as recited in claim 1, wherein adhering the graphene oxide layer to the substrate further comprises applying a solution of graphene oxide and water to the substrate.

9. The method as recited in claim 1, wherein reducing the graphene oxide layer further comprises applying a solution including hydrazine to the graphene oxide layer.

10. The method as recited in claim 1, wherein reducing the graphene oxide further comprises applying a solution including sodium borohydride to the graphene oxide layer.

* * * * *

UNITED STATES PATENT AND TRADEMARK OFFICE
CERTIFICATE OF CORRECTION

PATENT NO. : 9,011,968 B2
APPLICATION NO. : 13/391158
DATED : April 21, 2015
INVENTOR(S) : Miller et al.

It is certified that error appears in the above-identified patent and that said Letters Patent is hereby corrected as shown below:

On the Title Page

On Page 2, in Item "(56)", under "OTHER PUBLICATIONS", in Column 1, Line 28, delete "Enamies." and insert -- Enamines. --, therefor.

On Page 2, in Item "(56)", under "OTHER PUBLICATIONS", in Column 1, Line 28, delete "a-Substituted" and insert -- α-Substituted --, therefor.

On Page 2, in Item "(56)", under "OTHER PUBLICATIONS", in Column 1, Line 29, delete "B-Amino" and insert -- β-Amino --, therefor.

On Page 2, in Item "(56)", under "OTHER PUBLICATIONS", in Column 2, Line 17, delete "dowloaded" and insert -- downloaded --, therefor.

On Page 2, in Item "(56)", under "OTHER PUBLICATIONS", in Column 2, Line 47, delete "OxideNanoparticles:" and insert -- Oxide Nanoparticles: --, therefor.

On Page 2, in Item "(56)", under "OTHER PUBLICATIONS", in Column 2, Line 56, delete "Graphen" and insert -- Graphene --, therefor.

On Page 2, in Item "(56)", under "OTHER PUBLICATIONS", in Column 2, Line 61, delete "Tribiology" and insert -- Tribology --, therefor.

On Page 2, in Item "(56)", under "OTHER PUBLICATIONS", in Column 2, Line 62, delete "substratesynthesized" and insert -- substrate synthesized --, therefor.

On Page 3, in Item "(56)", under "OTHER PUBLICATIONS", in Column 1, Line 2, delete "momolayers," and insert -- monolayers, --, therefor.

Signed and Sealed this
Twenty-second Day of September, 2015

Michelle K. Lee
*Director of the United States Patent and Trademark Office*

CERTIFICATE OF CORRECTION (continued)
U.S. Pat. No. 9,011,968 B2

On Page 3, in Item "(56)", under "OTHER PUBLICATIONS", in Column 2, Lines 10-12, delete "Wang, X. et al., "N-Doping of Graphene Through Electrothermal Reactions with Ammonia," Science , May 8, 2009, pp. 768-771, vol. 324, No. 5928.".

On Page 3, in Item "(56)", under "OTHER PUBLICATIONS", in Column 2, Lines 13-15, delete "Lopez, V. et al., "Chemical Vapor Deposition Repair of Graphene Oxide: A Route to Highly Conductive Graphene Monolaters", Advanced Materials, 2009, 4683-4686.".

In the Drawings

In Fig. 4, Sheet 4 of 4, delete "uP/uC / DSP" and insert -- $\mu P/\mu C/DSP$ --, therefor.

In Fig. 4, Sheet 4 of 4, for Tag "444", in Line 1, delete "COMMUNICATION DEVICES (444)" and insert -- COMMUNICATION DEVICES (446) --, therefor.

In the Specification

In Column 1, Line 7, delete "35 U.S.C. §371" and insert -- 35 U.S.C. § 371 --, therefor.

In Column 3, Line 62, delete "substrate 102" and insert -- substrate 104 --, therefor.